Oct. 5, 1971    L. E. HERCHER    3,609,965
INTERNAL STEAM GENERATING ENGINE
Filed July 20, 1970    2 Sheets-Sheet 1

INVENTOR.
LEROY E. HERCHER
BY Robert Medwick
ATTORNEY

United States Patent Office 3,609,965
Patented Oct. 5, 1971

3,609,965
INTERNAL STEAM GENERATING ENGINE
Leroy E. Hercher, 311 Meridian Road,
San Jose, Calif. 95126
Filed July 20, 1970, Ser. No. 56,300
Int. Cl. F01k 21/02
U.S. Cl. 60—27
11 Claims

ABSTRACT OF THE DISCLOSURE

The internal steam generating engine includes a cylinder with inlet and outlet ports and a reciprocating piston connected by a rod to a crankshaft to produce rotary motion, wherein water rather than steam is injected into the working chamber of its cylinder. Its piston has an air friction producing unit with an elongated pocket and a plurality of narrow elongated passageways to cause the compressed and expanding mixture in the working chamber of the cylinder to produce heat to assist electrical heating elements in converting the injected water into expanding steam and also to maintain the steam pressure in the cylinder during the power stroke of the piston. Its crankcase includes a circumferential liner to direct escaping water to the bottom of the crankcase below its oil reservoir for removal thereof.

AN INTERNAL STEAM GENERATING ENGINE

The present invention relates to a steam engine, and more particularly relates to an internal steam generating reciprocating engine.

Engines are generally classified as being of the internal combustion or external combustion type. In an internal combustion engine, a fuel is burned within the engine itself. Whether the fuel used is gasoline, diesel oil, or other combustible fuel, the exhaust gases therefrom contribute to smog producing irritants in the surrounding air, and are generally deleterious to health and well being. For an external combustion engine such as a steam engine, the fuel utilized or the heat producing means may be selected so as not to have these disadvantages of the internal combustion type engine, but other disadvantages are present. A boiler with a furnace or other heat producing means is generally used which involves large and bulky associated equipment. In addition, the produced steam must be conveyed to the engine thus requiring piping and insulation to prevent thermal losses. Where power efficiency is not an important factor, an external combustion steam engine is preferred to the internal combustion engine. Nevertheless, it is desirable to eliminate some of the additional units utilized with the steam engine, or at least to reduce the large size and bulk of the associated units required for the steam engine.

Accordingly, the present invention provides an internal steam generating engine having a reciprocating piston within a cylinder in which water rather than steam is injected. Its piston has an air friction producing unit with an elongated pocket and a plurality of narrow elongated passageways to cause the compressed and expanding gases in the chamber of the cylinder to produce heat to assist electrical heating elements in converting the injected water into expanding steam and also to maintain the steam pressure in the cylinder during the power stroke of the piston. Consequently, bulky equipment such as external boilers and furnaces with connecting insulated pipes are not required to be used in conjunction therewith, thereby providing the stated advantages of a steam engine over the gasoline or oil consuming internal combustion engine.

It is therefore an object of this invention to provide an internal steam generating engine of the reciprocating piston type with associated equipment that is relatively small in size.

It is another object of this invention to provide a steam engine for producing expanding steam within a chamber in a cylinder of a reciprocating piston type engine.

Still another object of this invention is to provide an air friction generating unit in a piston reciprocating steam engine which cooperates with electrical heating units in order to more uniformly heat the gases in the chamber in which steam is produced.

A further object of this invention is to provide a movable heat producing source within the cylinder of an engine by forming a heat generator unit on the surface of the reciprocating piston inside the cylinder.

Another object of this invention is to provide a heat generator within a reciprocating piston engine to enable a more even power thrust throughout the full length of the power stroke of the reciprocating piston.

It is also an object of this invention to provide in an internal steam generating engine of the reciprocating piston type which has a crankcase with a circumferential liner to direct escaping water for the removal thereof.

Still another object of this invention is to provide a steam engine that doesn't require an external furnace or boiler with connecting pipes thereby eliminating such bulky equipment and the thermal losses associated therewith.

A still further object of this invention is to provide an internal steam producing engine which will conform to conventional forms of manufacture, be of simple construction and efficient in operation so as to provide a device that will be economically feasible, long lasting, and inexpensive to operate.

The novel features which are believed to be characteristic of the invention, both as to its organization and method of operation, together with further objects and advantages thereof, will be better understood from the following description considered with the accompanying drawings in which an embodiment of the invention is illustrated by way of example. It is to be expressly understood, however, that the drawings are for the purpose of illustration and description only, and are not intended as a definition of the limits of the invention.

Figure 1:
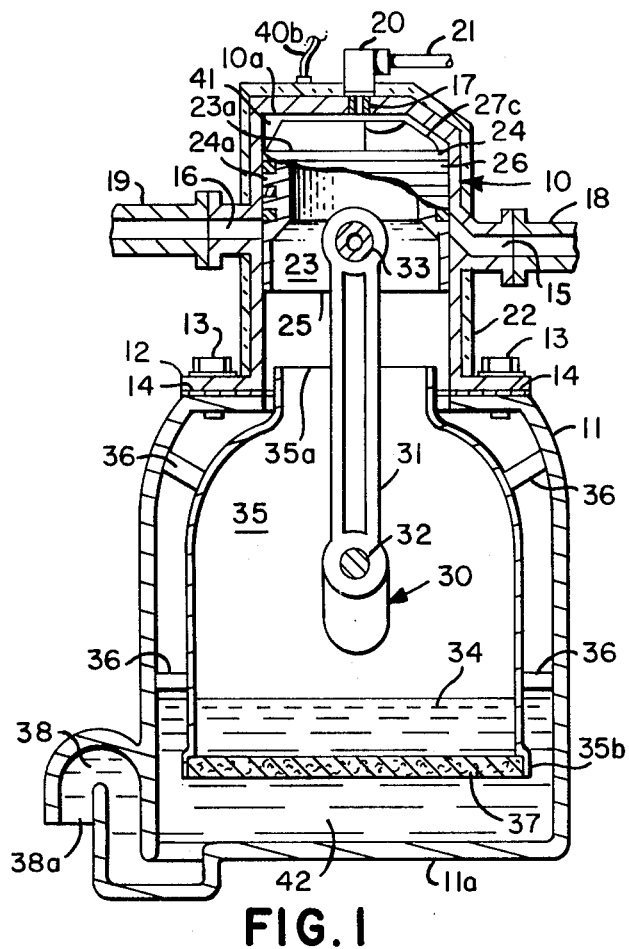
FIG. 1 is a vertical sectional view of the internal steam generating engine of the present invention taken substantially upon a plane passing through the longitudinal axis of the cylinder and showing its piston at the top of the compression stroke.
Figure 3:
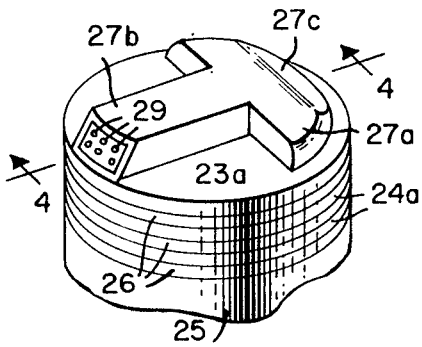
FIG. 3 is a fragmentary perspective view of the piston seen in FIG. 2 showing its air friction heat producing unit.
Figure 4:
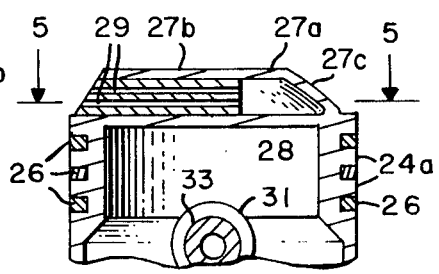
FIG. 4 is a side sectional view of the piston taken substantially along lines 4—4 of FIG. 3.

Referring now to the drawings, there is seen in FIG. 1 a vertical sectional view of an embodiment of the internal steam generating engine of the present invention. The engine includes a cylinder generally designated by the numeral 10, and a crankcase generally referred to by the numeral 11. Cylinder 10 in crank case 11 may be made of cast iron or aluminum alloy to enable the engine to withstand the pressures and temperatures involved without distortion. Cylinder 10 is provided with a circumferential mounting flange 12 at its lower end and is attached to the top of crankcase 11 in any convenient manner such as by bolt fasteners 13. A gasket 14 which may be made of copper and asbestos is positioned between mounting flange 12 and the top of crankcase 11 to provide a seal therebetween.

Cylinder 10 has an intake port 15, an exhaust port 16, and a water injection inlet 17. An intake manifold 18 is secured to the intake port 15, and an exhaust manifold 19 is secured to the exhaust port 16. A water injection spray element 20 is secured to water injection inlet 17, and is connected via conduit 21 to a suitable water injection system (not shown). A heat insulating lining 22, which may be made of asbestos or the like, surrounds cylinder 10 to retain the heat developed within the engine and thereby increase its operating efficiency. A reciprocating piston 23 is located within cylinder 10, said piston 23 is closed at one end forming a head generally designated by the reference numeral 24, and is open at its other end forming a skirt generally designated by the reference numeral 25. Head 24 of piston 23 is provided with ring lands 24a forming circumferential grooves in which there are disposed any conventional type of compression and oil rings 26.

With attention now directed more particularly to FIGS. 2 through 5 of the drawings, it will be seen that an air friction producing unit 27 forms a projecting member which is secured on end face 23a of piston 23. The air friction producing unit 27 is seen to be a generally T-shaped projection member including a cross-portion 27a and a leg portion 27b. Cross-portion 27a has a hollow interior forming an elongated pocket 28 extending transversely between intake port 15 and exhaust port 16. Leg portion 27b is seen to have a plurality of narrow elongated passageways 29 therein extending from elongated pocket 28 of cross portion 27a and being directed from pocket 28 toward exhaust port 16.

In order to enable piston 23 to be moved back and forth along said cylinder 10, a rotary converter means is provided which includes a crankshaft 30 and a connecting rod 31. Crankshaft 30 converts the reciprocating motion of piston 23 to rotary motion and also carries the power output. Crankshaft 30 is journalled in the end walls of crankcase 11 and includes an eccentrically located crankpin 32. The bottom end of connecting rod 31 is journalled on crankpin 32. The upper end of connecting rod 31 rides within piston 23 on the middle of wristpin 33 which joins the connecting rod 31 to piston 23 and, at the same time provides a flexible or hingeable connection between them.

Figure 7:
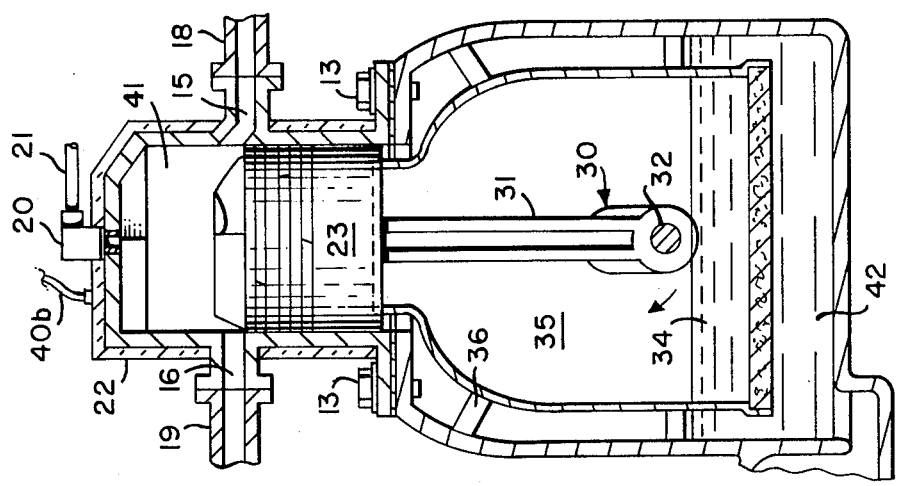
FIG. 7 is a view of the internal steam generating engine as seen in FIG. 1, but showing its piston disposed at the bottom of the power stroke.

Crankcase 11 is seen to be an enclosure that supports crankshaft 30 and provides a reservoir 34 at its lower end for lubricating oil. Mounted within crankcase 11 is a crankcase liner 35 spaced from the side walls of crankcase 11 by strut connectors 36. Crankcase liner 35 has a top portion extending inwardly and has a circular rim 35a located inside the skirt 25 of piston 23 to clear it when piston 23 is in its downward position as seen in FIG. 7. Crankcase liner 35 also has a bottom circular rim 35b forming an opening in which is fitted an oil filter 37. An inverted U shaped water escape port 38 is provided at the bottom of crankcase 11 extending from the bottom 11a of crankcase 11 to a height slightly above oil filter 37 and then extends downwardly to an opening 38a.

Figure 2:
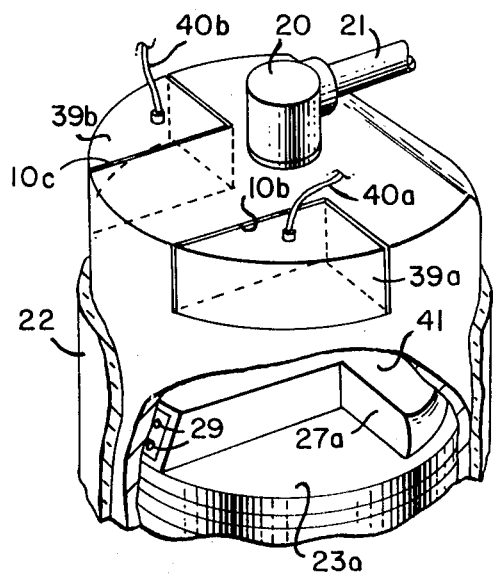
FIG. 2 is a fragmentary perspective view of the piston and the upper portion of the cylinder of the internal steam generating engine of the present invention.
Figure 5:
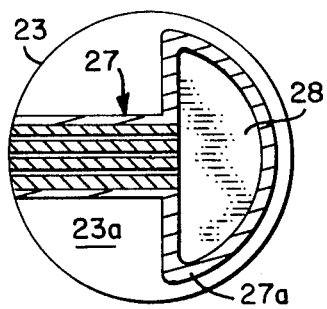
FIG. 5 is a horizontal sectional view of the piston taken substantially along lines 5—5 of FIG. 4 and showing its elongated pocket.

As seen more clearly in FIG. 2, the upper end wall 10a of cylinder 10 is formed with a pair of recessed portions 10b and 10c conforming the shape of end wall 10a to that of the projection member 27 on end face 23a of piston 23. Accordingly, when piston 23 is at the top of the compression stroke as seen in FIG. 1, the shape of the recessed upper end wall 10a of cylinder 10 enables the end face 23a of piston 23 and the upper surface of projection member 27 to be disposed very close to each other. A pair of electrical heating elements 39a and 39b are attached to the upper surface of cylinder 10 within recesses 10b and 10c respectively. Electrical heating elements 39a and 39b have electrical cable inputs 40a and 40b for connecting to a suitable electrical power supply, and are seen to have a shape to complete the cylindrical form of cylinder 10.

As in conventional internal combustion engines, the materials used for the parts of this internal steam generating engine may be made of similar materials for like parts.

In operation, assuming piston 23 in a position at the top of the compression stroke as illustrated in FIG. 1 of the drawings, a fine spray of water is then injected by water injection spray element 20 into the space between the inside top of cylinder 10 and the top of piston 23, said space forming the working chamber 41 within cylinder 10. Electrical heating units 39a and 39b being turned on provides heat energy to heat the space of working chamber 41. The injected spray of water upon encountering the heat being generated by electrical heating units 39a and 39b will form steam and then expand to force piston 23 in a downward direction. The timing and duration of the water spray emitted by water injection spray element 20 is selected to start this power stroke at the uppermost position of piston 23 and to provide an expanding steam force to complete the power stroke.

Figure 6:
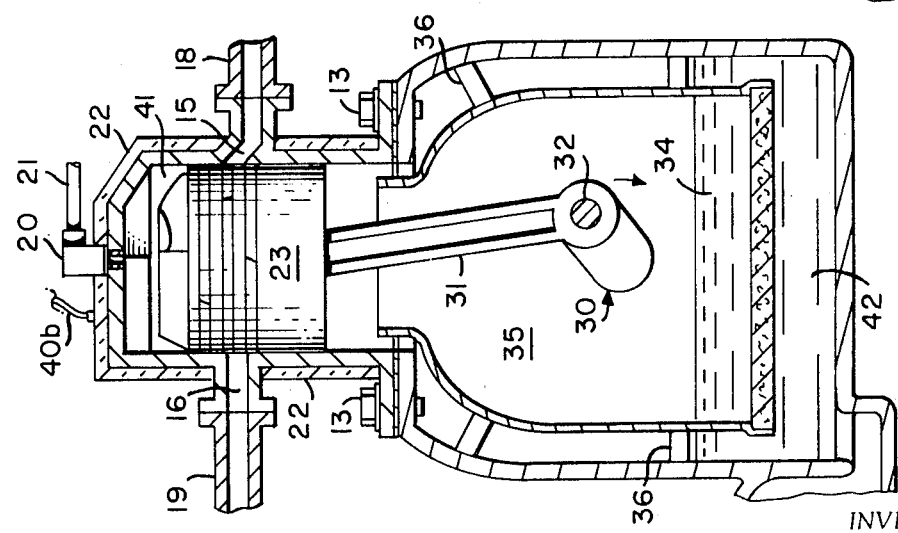
FIG. 6 is a view of the internal steam generating engine as seen in FIG. 1, but showing its piston approaching the bottom of the power stroke.

The steam formed in working chamber 41 will also then enter elongated pocket 28 of projecting member 27 via its several restricted passageways 29 tending to equalize the pressure in elongated pocket 28 with that in working chamber 41. The movement of the mixture of the air and steam from working chamber 41 into elongated pocket 28 through restricted passageways 29 will produce friction heat and further increase the temperature of air friction producing unit 27. It will be realized that the heat thus generated in the projecting member provides a movable heat producing source. As piston 23 is driven downwardly as seen in FIG. 6, the space of working chamber 41 is increased thereby reducing the pressure therein. The compressed mixture in elongated pocket 28 being further heated will then increasingly expand and move via restricted passageways 29 to working chamber 41 tending to equalize the pressure in elongated pocket 28 with that in working chamber 41. Although elongated pocket 28 communicates with working chamber 41, the movement of piston 23 toward the bottom of the power stroke prevents the pressures within elongated pocket 28 and working chamber 41 from being equalized until the exhaust port 16 is uncovered. As additional heat is being generated, the expansive force of the steam will be increased thereby tending to maintain the steam pressure. During this power stroke, piston 23 is driven in a downward direction transmitting power to crankshaft 30.

As piston 23 continues to move downwardly toward its position shown in FIG. 7, piston 23 will first uncover exhaust port 16 whereby the wet mixture in working chamber 41 and in elongated pocket 28 will be discharged through exhaust port 16 and the pressure in working chamber 41 is then reduced. Restricted passageways 29 will prolong the discharge of the mixture from elongated pocket 28 to cause a longer period of circulation in working chamber 41 as hereinafter indicated. As piston 23 reaches the bottom of its power stroke and the heated wet mixture is passed outwardly through exhaust port 16, a fresh supply of dry air is admitted through intake port 15 which is deflected upwardly by means of the curved surface 27c of projecting member 27. Curved surface 27a forms a shoulder on cross-portion 27a that extends upwardly from end face 23a of piston 23, said shoulder being aligned with exhaust port 16 when piston 23 is at the bottom of its power stroke. The upward deflection of the incoming dry air and the downward movement of the egressing wet mixture within working chamber 41 effects a counter-clockwise circulation within working chamber 41, which provides for a more complete scavenging of the exhaust mixture and a larger intake of the fresh dry air.

Figure 8:
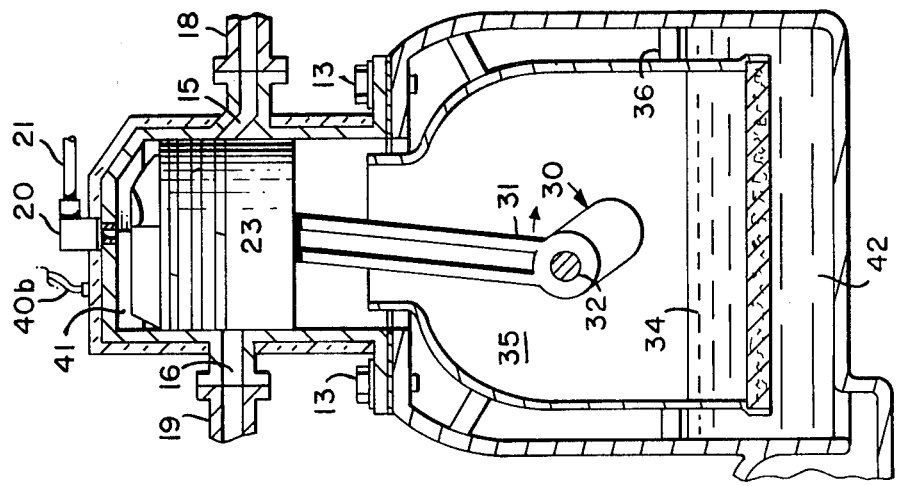
FIG. 8 is a view of the internal steam generating engine as seen in FIG. 1, but showing its piston approaching the top of the compression stroke.

The momentum of the crankshaft 30 with its accompanying flywheel will cause crankshaft 30 to continue to rotate thereby driving piston 23 upwardly in cylinder 10. Piston 23 will thereupon block intake port 15, then block exhaust port 16, and proceed to move upwardly as seen in FIG. 8 to the top of its compression stroke as initially indicated. The dry air in working chamber 21 will be compressed and heated. Thereupon another fine spray of water is introduced into working chamber 41 via water injection inlet 17 by water injection spray element 20, and the described cyclic series of operations are repeated over again and continues for the desired duration of operation.

In order to lubricate the cylinder walls, the piston and its wrist pin, the crankshaft and its connecting rod bearings, and other moving parts, a reservoir of lubricating oil is required. Several different types of lubricating oil circulation systems may be used, but it is desirable to have a uniform oil level that is essentially free of any extraneous material including other liquids such as water. Since steam under pressure is formed in working chamber 41 above piston 23, it will be inevitable that some water will pass by the rings 26 around piston 23 and thereby enter the interior of crankcase 11 where a supply of lubricating oil is maintained. Crankcase liner 35 will cause such water bypassing piston rings 26 to be directed first toward the bottom 11a of crankcase. When a sufficient amount of water 42 is accumulated on the bottom 11a of crankcase 11, the excess water will escape via escape port 38 through its opening 38a. Since oil is lighter than water, the lubricating oil in crankcase will pass through filter 37 to be freed of extraneous material, and will float on the top of the accumulated water 42 on the bottom 11a of crankcase 11. Accordingly, a filtered oil reservoir 34 is then available above filter 37 for the purpose enabling the lubrication of the several moving parts of the engine.

It will be realized, that the internal steam generating engine of this invention can be adopted for a four cycle operation instead of a two cycle operation as herein described. Further, such a steam generating engine of the present invention could include multiple cylinders arranged side by side, in groups, or in other arrangements similar to other types of engines. Moreover, instead of water being the fluid introduced by injection spray element 20, another suitable fluid that will likewise expand due to heat can be utilized in the operation of the engine of this invention.

Having herein described my invention, what is claimed as new is:

1. An internal steam generating engine comprising:
   a cylinder having an intake port, an exhaust port, and a water injection inlet;
   a reciprocating piston for moving back and forth along said cylinder;
   rotary converter means including a rod and a crankshaft,
       said rod connecting the piston to the crankshaft to convert the reciprocatory motion of the piston to rotative motion of the crankshaft;
   a crankcase for holding a reservoir of oil therein and being attached to said cylinder for enclosing said rotary converter means;
   an air friction heat producing unit being a generally T-shaped projection member with a cross and a leg portion connected to the top of the piston,
       said projection member forming an enclosure with an elongated pocket extending transversely between the intake and exhaust ports along the cross portion of the generally T-shaped projection member, and having a plurality of narrow elongated passageways therein extending from the pocket within the leg portion of the projection member and being directed from the pocket toward the exhaust port, and
   said cylinder having an end wall with a pair of recessed portions conforming the shape of the end wall to the shape of the projection member of the air friction heat producing unit on the piston; and
   a pair of electrical heating elements attached to the end wall of the cylinder, each electrical heating element being positioned on one of the recessed portions of the end wall.

2. The internal steam generating engine defined in claim 1 wherein said projection member has a shoulder formed on the cross portion thereof extending upwardly and away from the side wall of the cylinder to direct air coming in from the intake port upwardly above the piston.

3. The internal steam generating engine defined in claim 1 wherein the water injection inlet is in the end wall of the cylinder above the leg portion of the projection member and in between the pair of the electrical heating elements.

4. The internal steam generating engine defined in claim 1 which additionally includes a circumferential crankcase liner within the crankcase and being spaced therefrom to direct any water passing between the piston and the walls of the cylinder to the bottom of the crankcase below its reservoir of oil.

5. The internal steam generating engine defined in claim 1 wherein the intake port is formed in said cylinder diametrically opposite said intake port, and wherein the shoulder of the projection member is aligned with the intake port when the piston is at the bottom of its power stroke.

6. An internal steam generating engine comprising:
   a two cycle reciprocating engine having a cylinder, a piston, and a rotary converter,
       said cylinder having an intake port, an exhaust port, and a fluid injection inlet;
   an air friction heat producing unit forming a projection on the end face of the piston,
       said projection having an enclosed pocket therein and a plurality of narrow elongated passageways extending from the pocket toward an open end, and
   said cylinder having an end wall with a pair of recessed portions conforming the shape of the end wall to the shape of the projection of the friction heat producing unit; and
   a pair of electrical heating elements attached to the end wall of the cylinder, each electrical heating element being positioned on one of the recessed portions of the end wall.

7. The internal generating engine defined in claim 6 wherein said projection has a shoulder formed thereon extending upwardly and away from the side wall of the cylinder to direct air coming in from the intake port upwardly above the piston, and wherein said shoulder is aligned with the intake port when the piston is at the bottom of its power stroke.

8. The internal steam generating engine defined in claim 6 wherein the fluid injection inlet is in the end wall of the cylinder above the plurality of narrow elongated passageways and in between the pair of the electrical heating elements.

9. The internal steam generating engine defined in claim 6 wherein said projection has a shoulder formed thereon extending upwardly and away from the side wall of the cylinder, said shoulder being aligned with the intake port when the piston is at the bottom of its power stroke, and wherein the fluid injection inlet is in the end wall of the cylinder above the plurality of narrow elongated passageways and in between the pair of the electrical heating elements.

10. The internal steam generating engine defined in claim 6 which includes a crankcase for holding a reservoir of oil therein and being attached to said cylinder for enclosing said rotary converter, and which additionally includes a circumferential crankcase liner within the crankcase and being spaced therefrom to direct any fluid passing between the piston and the walls of the cylinder to the bottom of the crankcase below its reservoir of oil.

11. The internal steam generating engine defined in claim 6 wherein said pocket is elongated and extends transversely between the intake and exhaust ports, and said narrow elongated passageways are directed from the pocket toward the exhaust port.

References Cited

UNITED STATES PATENTS

| | | | |
|---|---|---|---|
| 2,402,699 | 6/1946 | Williams | 60—1 X |
| 3,251,183 | 5/1966 | Whitlow | 60—27 |

FOREIGN PATENTS

| | | | |
|---|---|---|---|
| 7,632 | 4/1908 | Great Britain | 60—27 |
| 617,649 | 8/1935 | Germany | 60—27 |
| 656,170 | 1/1936 | Germany | 60—27 |

MARTIN P. SCHWADRON, Primary Examiner

A. M. OSTRAGER, Assistant Examiner

U.S. Cl. X.R.

92—141